United States Patent
Jeon et al.

(10) Patent No.: US 12,464,116 B2
(45) Date of Patent: Nov. 4, 2025

(54) METHOD AND APPARATUS FOR VIDEO CODING USING BLOCK VECTOR WITH ADAPTIVE SPATIAL RESOLUTION

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Bum Yoon Kim, Yongin-si (KR); Yu Jin Lee, Suwon-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 103 days.

(21) Appl. No.: 18/374,488

(22) Filed: Sep. 28, 2023

(65) Prior Publication Data
US 2024/0031558 A1  Jan. 25, 2024

Related U.S. Application Data

(63) Continuation of application No. PCT/KR2022/004317, filed on Mar. 28, 2022.

(30) Foreign Application Priority Data

Apr. 2, 2021 (KR) .......... 10-2021-0043574
Mar. 25, 2022 (KR) .......... 10-2022-0037102

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/523* (2014.11)

(58) Field of Classification Search
CPC .......................... H04N 19/105; H04N 19/159
See application file for complete search history.

(56) References Cited

U.S. PATENT DOCUMENTS 10,484,687 B2  11/2019  Jung et al.
11,159,788 B2 * 10/2021  Chen ................. H04N 19/174
(Continued)

FOREIGN PATENT DOCUMENTS

KR  20180112510 A  10/2018
KR  20200107867 A   9/2020
(Continued)

OTHER PUBLICATIONS

International Search Report and Written Opinion cited in corresponding PCT application No. PCT/KR2022/004317; Jul. 21, 2022; 9 pp.

*Primary Examiner* — Irfan Habib
(74) *Attorney, Agent, or Firm* — Lempia Summerfield Katz LLC

(57) ABSTRACT

A method and an apparatus are disclosed for video coding using a block vector with an adaptive spatial resolution. The video coding method and the apparatus signal the spatial resolution of a block vector (BV) indicating the position of a reference block adaptively or signal the sign of a block (Continued)

vector difference adaptively in order to improve coding efficiency when intra block copy (IBC) is applied to a current block.

16 Claims, 18 Drawing Sheets

(51) Int. Cl.
*H04N 19/176* (2014.01)
*H04N 19/523* (2014.01)

(56) References Cited

U.S. PATENT DOCUMENTS

| | | | |
|---|---|---|---|
| 11,575,888 B2* | 2/2023 | Xu | H04N 19/157 |
| 11,683,504 B2* | 6/2023 | Wu | H04N 19/105 |
| | | | 375/240.13 |
| 11,695,946 B2 | 7/2023 | Zhang et al. | |
| 11,882,287 B2* | 1/2024 | Xu | H04N 19/52 |
| 11,889,089 B2* | 1/2024 | Jeon | H04N 19/70 |
| 11,910,005 B2* | 2/2024 | Zhu | H04N 19/52 |
| 11,930,176 B2* | 3/2024 | Zhang | H04N 19/186 |
| 12,010,340 B2* | 6/2024 | Xu | H04N 19/105 |
| 12,069,282 B2* | 8/2024 | Xu | H04N 19/593 |
| 12,108,051 B2* | 10/2024 | Lee | H04N 19/107 |
| 12,108,071 B2* | 10/2024 | Lim | H04N 19/85 |
| 12,132,911 B2* | 10/2024 | Bae | H04N 19/593 |
| 12,219,129 B2* | 2/2025 | Nien | H04N 19/593 |
| 2011/0293010 A1* | 12/2011 | Jeong | H04N 19/513 |
| | | | 375/E7.125 |
| 2015/0189272 A1* | 7/2015 | Peng | H04N 19/119 |
| | | | 375/240.02 |
| 2015/0195559 A1* | 7/2015 | Chen | H04N 19/11 |
| | | | 375/240.16 |
| 2015/0264355 A1* | 9/2015 | Hsiang | H04N 19/517 |
| | | | 375/240.02 |
| 2015/0334405 A1* | 11/2015 | Rosewarne | H04N 19/463 |
| | | | 375/240.02 |
| 2015/0373366 A1* | 12/2015 | He | H04N 19/463 |
| | | | 375/240.16 |
| 2015/0373370 A1* | 12/2015 | Rapaka | H04N 19/52 |
| | | | 375/240.02 |
| 2016/0227244 A1* | 8/2016 | Rosewarne | H04N 19/70 |
| 2016/0330474 A1* | 11/2016 | Liu | H04N 19/56 |
| 2018/0288417 A1 | 10/2018 | Jung et al. | |
| 2020/0359040 A1* | 11/2020 | Xu | H04N 19/52 |
| 2021/0160531 A1 | 5/2021 | Zhang et al. | |
| 2021/0250580 A1* | 8/2021 | Chen | H04N 19/105 |
| 2022/0086451 A1* | 3/2022 | Bae | H04N 19/176 |
| 2022/0150511 A1* | 5/2022 | Lee | H04N 19/593 |
| 2022/0150529 A1* | 5/2022 | Lim | H04N 19/184 |
| 2022/0182661 A1 | 6/2022 | Lee et al. | |
| 2022/0217382 A1 | 7/2022 | Zhang et al. | |
| 2022/0368925 A1* | 11/2022 | Jeon | H04N 19/70 |
| 2024/0187613 A1* | 6/2024 | Filippov | H04N 19/105 |
| 2024/0223756 A1* | 7/2024 | Zhang | H04N 19/176 |
| 2024/0406436 A1* | 12/2024 | Kim | H04N 19/573 |

FOREIGN PATENT DOCUMENTS

| | | |
|---|---|---|
| KR | 20200110164 A | 9/2020 |
| WO | 2021052505 A1 | 3/2021 |

* cited by examiner

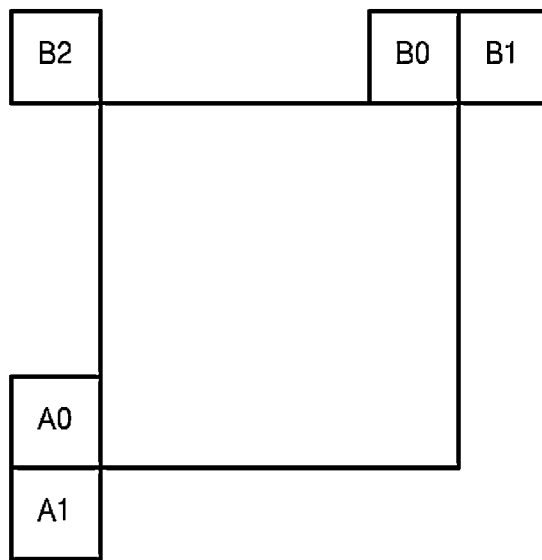
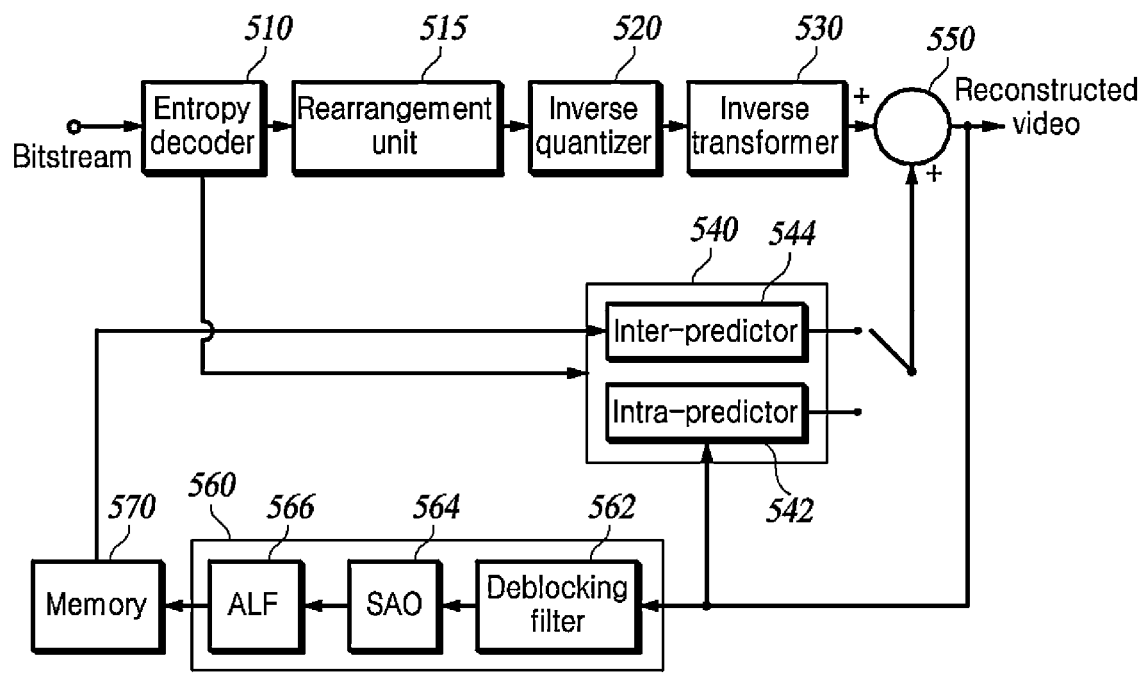
FIG. 4
FIG. 5

Current block     Top block to which AMVR is applied

Reference block indicated by BVP

Reference block by BVP+BVD

Area that is restored and can be referenced

Non-restored area

- - - → Block vector difference

METHOD AND APPARATUS FOR VIDEO CODING USING BLOCK VECTOR WITH ADAPTIVE SPATIAL RESOLUTION

CROSS-REFERENCE TO RELATED APPLICATIONS

This application is a Continuation of International Application No. PCT/KR2022/004317 filed on Mar. 28, 2022, which claims priority to Korean Patent Application No. 10-2021-0043574 filed on Apr. 2, 2021, and Korean Patent Application No. 10-2022-0037102 filed on Mar. 25, 2022, the entire disclosures of which are incorporated herein by reference.

TECHNICAL FIELD

The present disclosure relates to a video encoding method and an apparatus using block vector with an adaptive spatial resolution.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Unlike the video generally acquired using an image sensor (hereinafter referred to as 'natural video'), the video generated by a computer (hereinafter referred to as 'screen content') shows the characteristics without including repetitive patterns, strong edges, and noise. Due to these characteristics, when screen content is encoded using conventional encoders such as HEVC and VVC, which focus on encoding natural video, there is a problem of low coding efficiency. This is because the characteristics of natural video and the characteristics of screen content are very different.

In order to solve this problem, technologies specialized in encoding the screen content have recently been developed. Intra Block Copy (IBC) technology searches for an area (i.e., a reference block) most similar to an area (i.e., a current block) to be encoded (or decoded) in a current picture and then uses the searched area as a predictor. When prediction is performed on the current block in the IBC mode, the reference block becomes a predictor of the current block, and a displacement between the current block and the reference block may be expressed as a block vector (BV). The encoder encodes the block vector and transmits the encoded block to the decoder. In this case, in order to increase compression efficiency, the encoder does not transmit the block vector as it is. The encoder divides the BV into a block vector predictor (BVP) and a block vector difference (BVD). Then the encoder encodes the BVP and the BVD.

Meanwhile, in order to encode the block vector predictor, a merge mode and an advanced motion vector prediction (AMVP) mode, which are used in encoding a motion vector, may also be applied to encoding of the block vector. For example, in order to use a block vector used in a neighboring block as a block vector predictor, the encoder may signal an index indicating the selected block vector predictor to the decoder.

When the block vector difference is signaled to the decoder, the encoder also transmits a flag indicating the spatial resolution of the block vector difference. In the conventional art, the spatial resolution of the block vector difference is signaled as one of 1-pel and 4-pel according to a corresponding flag, and the encoder and the decoder determine the spatial resolution of the block vector and the spatial resolution of the block vector difference according to these resolutions. Accordingly, the block vector could not be expressed according to a subpixel unit smaller than one pixel unit. This is because the existing encoding method was designed under the premise that, unlike natural video, conventional screen content is generated using a computer, and thus subpixel units smaller than pixel units are not needed. However, unlike conventional screen content, in the recently produced super high definition screen content, there are many cases in which it is advantageous to express a block vector in subpixel units. Therefore, in order to improve the coding efficiency of screen content, it may need to consider a method for effectively encoding the spatial resolution of a block vector.

SUMMARY

The present disclosure seeks to provide a video coding method and an apparatus for signaling the spatial resolution of a block vector (BV) indicating the position of a reference block adaptively or signaling the sign of a block vector difference adaptively in order to improve coding efficiency when intra block copy (IBC) is applied to a current block.

At least one aspect of the present disclosure provides a method for adaptively generating a block vector of a current block in an intra block copy (IBC) mode performed by a video decoding apparatus. The method includes decoding a block vector predictor index, an absolute value of a block vector difference, and a block vector spatial resolution precision index from a bitstream. The method also includes generating a block vector predictor candidate list of the current block and generating a block vector predictor from the block vector predictor candidate list using the block vector predictor index. The method also includes generating a block vector spatial resolution candidate list and generating a block vector spatial resolution from the block vector spatial resolution candidate list using the block vector spatial resolution precision index. The method also includes deriving or decoding a sign of the block vector difference using the block vector spatial resolution, the block vector predictor, and the absolute value of the block vector difference. The method also includes generating the block vector difference by combining the absolute value and the sign of the block vector difference. The method also includes generating the block vector by combining the block vector predictor and the block vector difference.

Another aspect of the present disclosure provides a method for adaptively generating a block vector of a current block in an intra block copy (IBC) mode performed by a video decoding apparatus. The method includes decoding a block vector predictor index and an absolute value of a block vector difference from a bitstream. The method also includes generating a block vector predictor candidate list of the current block and generating a block vector predictor from the block vector predictor candidate list using the block vector predictor index. The method also includes deriving a block vector spatial resolution and deriving or decoding a sign of the block vector difference using the block vector spatial resolution, the block vector predictor, and the absolute value of the block vector difference. The method also includes generating the block vector difference by combining the absolute value and the sign of the block vector difference. The method also includes generating the block vector by combining the block vector predictor and the block vector difference.

Yet another aspect of the present disclosure provides a method for adaptively generating a block vector of a current block in an intra block copy (IBC) mode performed by a video encoding apparatus. The method includes obtaining a block vector predictor index and an absolute value of a block vector difference from a high level. The method also includes generating a block vector predictor candidate list of the current block and generating a block vector predictor from the block vector predictor candidate list using the block vector predictor index. The method also includes deriving a block vector spatial resolution and deriving or obtaining a sign of the block vector difference using the block vector spatial resolution, the block vector predictor, and the absolute value of the block vector difference. The method also includes generating the block vector difference by combining the absolute value and the sign of the block vector difference. The method also includes generating the block vector by combining the block vector predictor and the block vector difference.

As described above, the present disclosure provides a video coding method and an apparatus for signaling the spatial resolution of a block vector (BV) indicating the position of a reference block adaptively or signaling the sign of a block vector difference adaptively when an intra block copy (IBC) is applied to a current block. Thus, coding efficiency is improved.

BRIEF DESCRIPTION OF THE DRAWINGS

FIG. 4 illustrates neighboring blocks of a current block.

FIG. 5 is a block diagram of a video decoding apparatus that may implement the techniques of the present disclosure.

DETAILED DESCRIPTION

Figure 1:
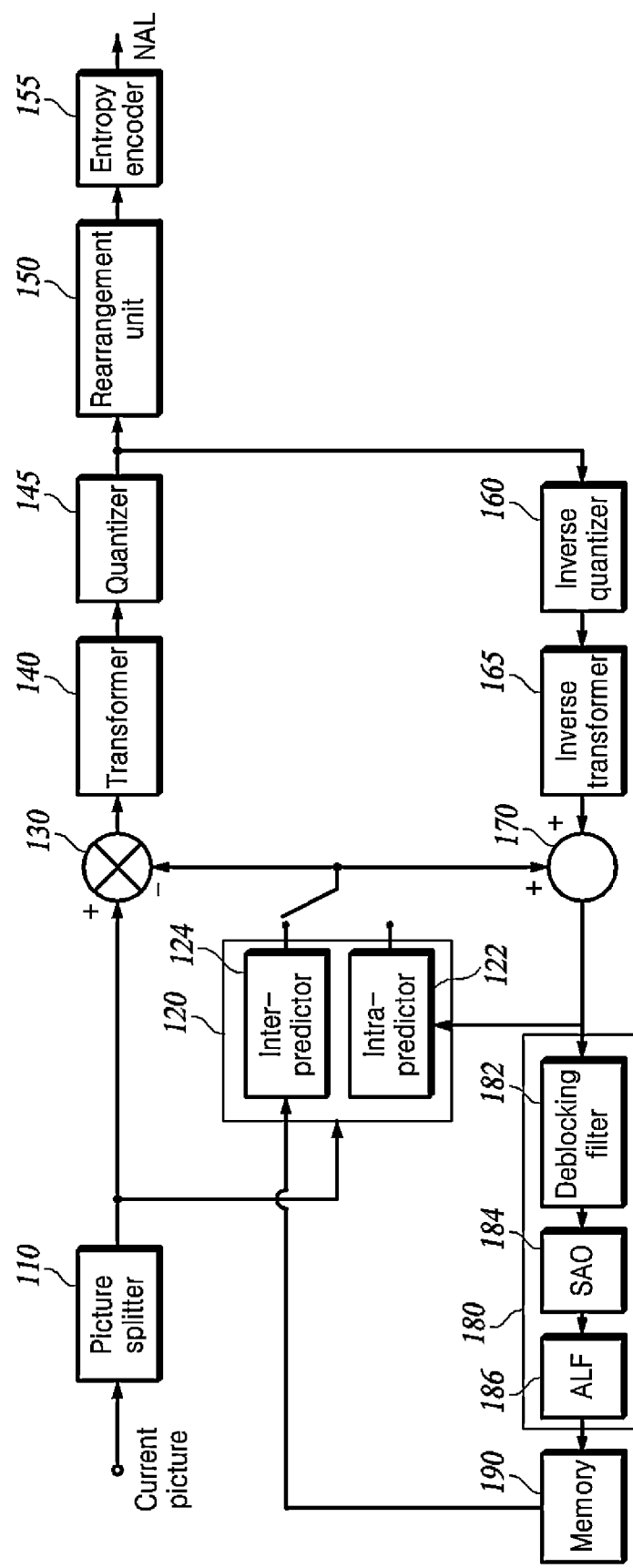
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
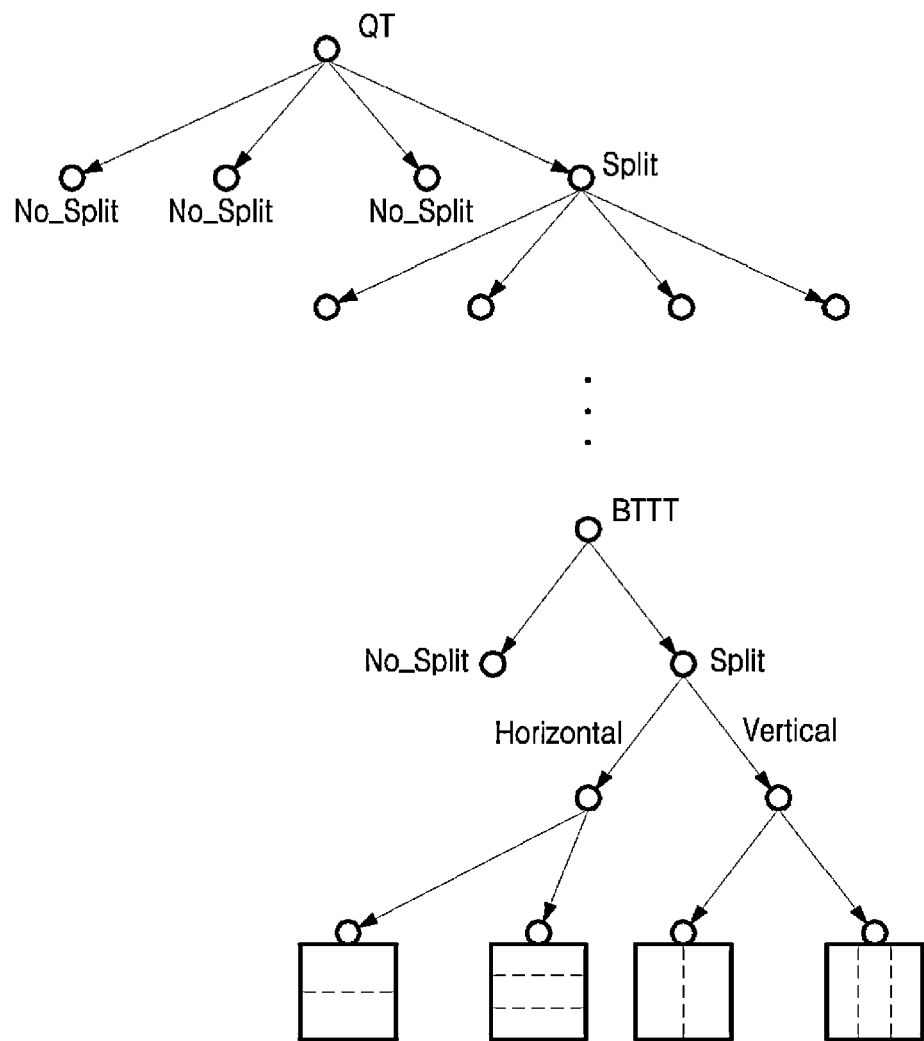
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
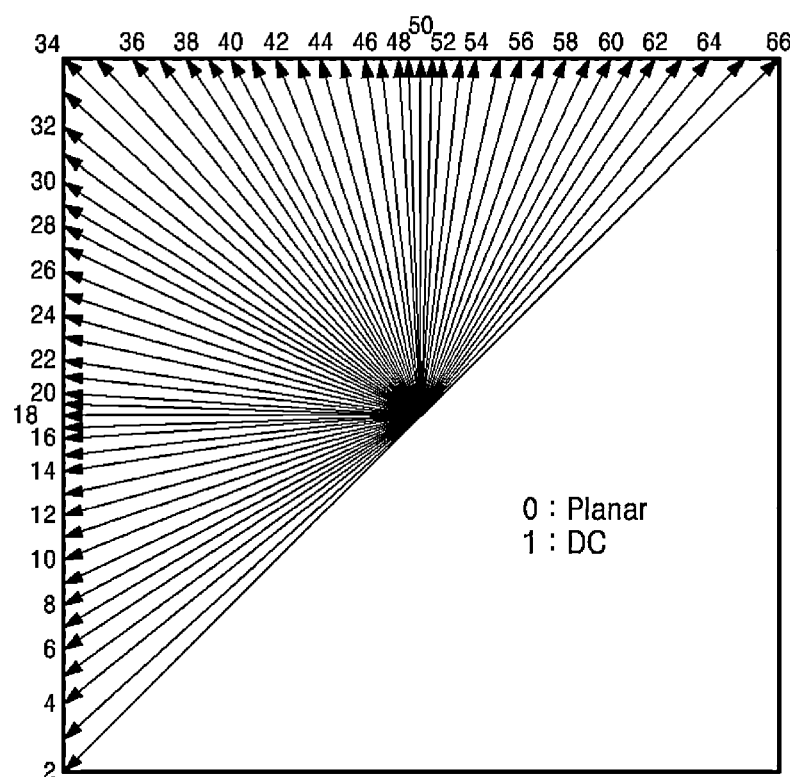
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
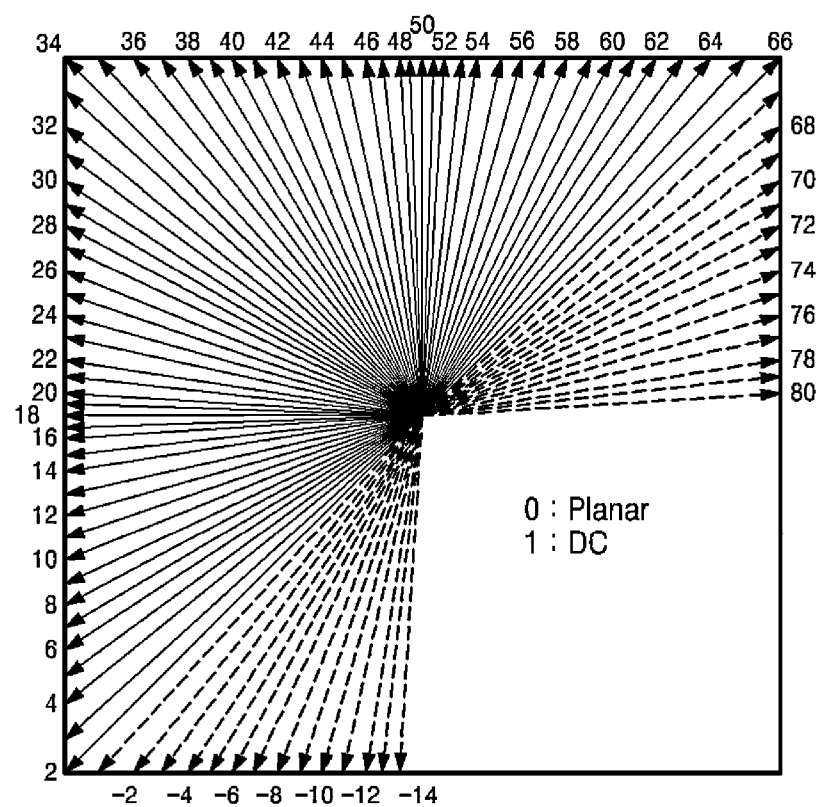

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for signaling the spatial resolution of a block vector (BV) indicating the position of a reference block adaptively or signaling the sign of a block vector difference adaptively when intra block copy (IBC) is applied to a current block.

The following embodiments may be applied to an intra predictor 122 in the video encoding apparatus. Further, the following embodiments may be applied to an entropy decoder 510 and an intra predictor 542 in the video decoding apparatus.

In the following description, the term 'target block' to be encoded/decoded may be used in the same meaning as the current block or coding unit (CU) as described above, or the term 'target block' may mean a partial region of the coding unit.

Hereinafter, a specific flag of true indicates that a value of the corresponding flag is 1, and the specific flag of false indicates that the value of the corresponding flag is 0.

I. Intra Block Copy (IBC) Technology

Figure 6:
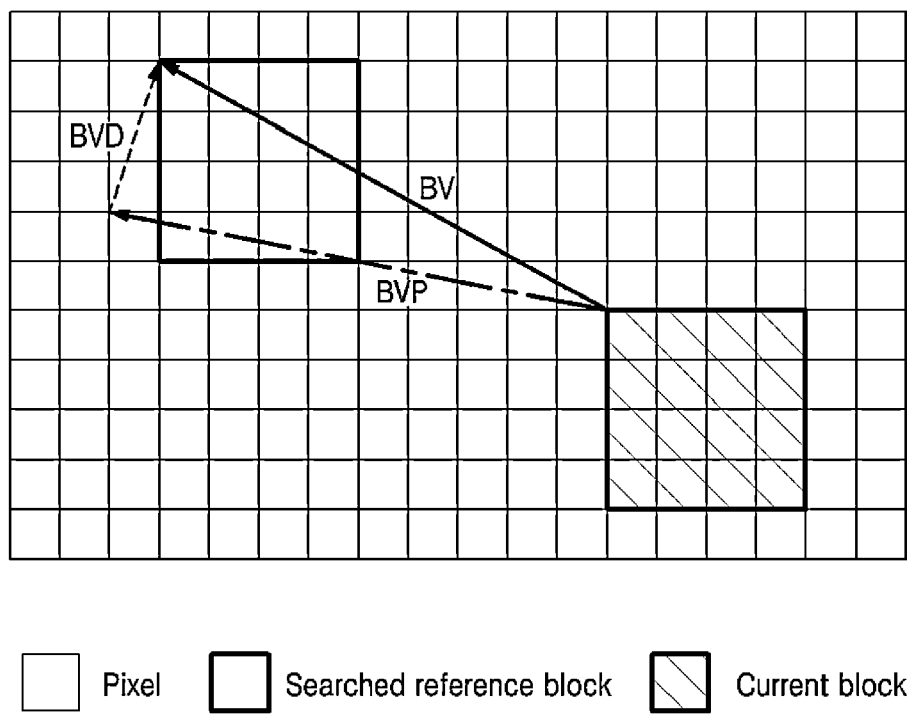
FIG. 6 is a diagram illustrating an intra block copy (IBC).

When search and prediction are performed in the IBC mode for the current block, as illustrated in FIG. 6, the reference block becomes a predictor of the current block, and the displacement between the current block and the reference block is expressed to a block vector (BV). In order to increase the coding efficiency, the video encoding apparatus does not transmit the block vector as it is, but divides the block vector into a block vector predictor (BVP) and a block vector difference (BVD), encodes the encoded BVP and the encoded BVD, and then may transmit the encoded BVP and the encoded BVD to the video decoding apparatus.

Hereinafter, the spatial resolution of the BVD and the spatial resolution of the block vector are regarded as the same. In addition, the spatial resolution values of the horizontal and vertical elements of the block vector may be identically determined using one flag.

Figure 7:
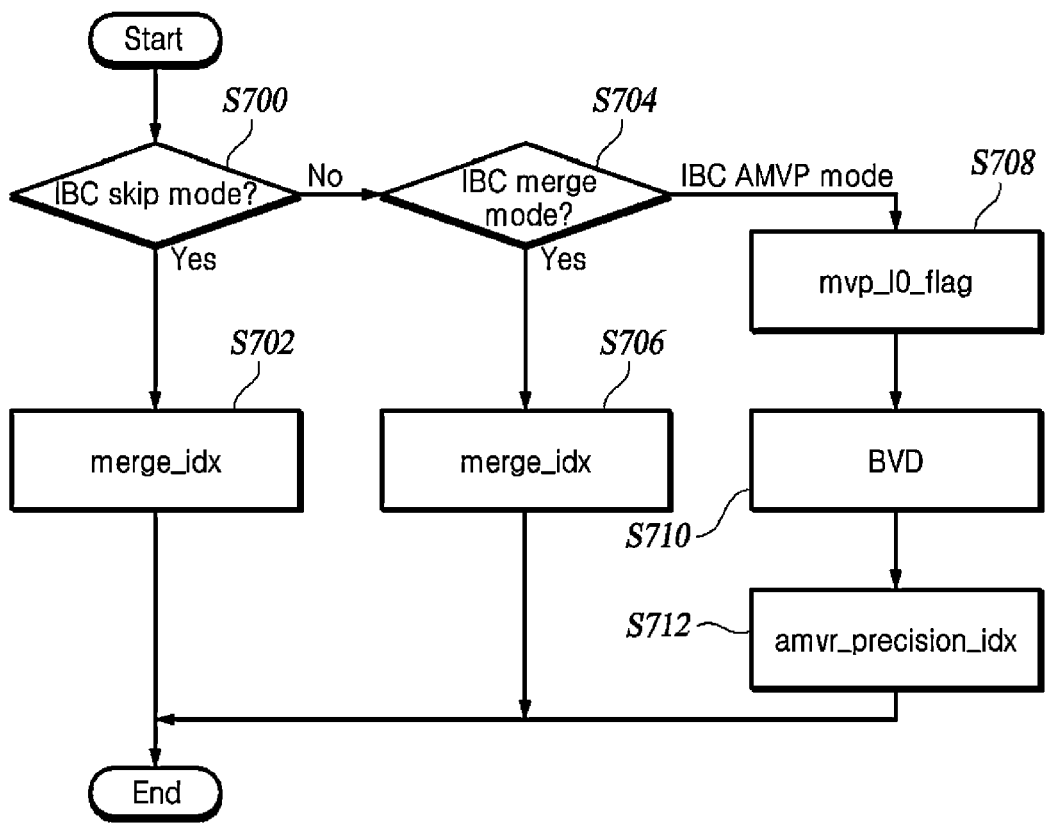
FIG. 7 is a flowchart illustrating a block vector transmission method for each IBC transmission method.

FIG. 7 is a flowchart illustrating a block vector transmission method for each IBC transmission method.

Meanwhile, as illustrated in FIG. 7, the IBC technology may be classified into an IBC skip mode, an IBC merge mode, and an IBC AMVP mode according to a block vector transmission method. The video encoding apparatus uses the same block vector transmission method as in the IBC merge mode in the IBC skip mode, but the video encoding apparatus may not transmit a residual block corresponding to a difference between a current block and a prediction block. Meanwhile, the illustration shown in FIG. 7 may be similarly applied to a video decoding apparatus, but the video decoding apparatus may parse necessary flags from a bitstream.

The video encoding apparatus identifies whether it is in an IBC skip mode (S700), and if not (No in S700), the video encoding apparatus checks whether it is in an IBC merge mode (S704).

In the case of the IBC skip mode or the IBC merge mode (Yes in S700 or Yes in S704), the video encoding apparatus obtains a merge index merge_idx indicating one of block vectors included in the IBC merge list (respectively S702 and S706). However, the video encoding apparatus does not obtain the BVD. The IBC merge list may be constituted in the same way by the video encoding apparatus and the video decoding apparatus. After selecting a block vector predictor (BVP) indicated by the merge index, the video encoding apparatus may use the selected BVP as a block vector. Meanwhile, the video encoding apparatus transmits the merge index to the video decoding apparatus, but the video encoding apparatus does not transmit BVD.

In the case of the IBC AMVP mode (No in S704), the video encoding apparatus sequentially obtains mvp_l0_flag, BVD, and amvr_precision_idx (respectively S708, S710, and S712). Here, mvp_l0_flag is an index indicating a predictor of a motion vector and is also used as an index indicating the BVP for a block vector. In addition, amvr_precision_idx is an index indicating the spatial resolution of a motion vector according to the application of adaptive motion vector resolution (AMVR) and is also used as an index indicating the spatial resolution of a block vector. The video encoding apparatus may select a block vector indicated by mvp_l0_flag as the BVP and then may generate a block vector by summing the block vector with the BVD. Meanwhile, the video encoding apparatus transmits mvp_l0_flag, BVD, and amvr_precision_idx to the video decoding apparatus.

Hereinafter, mvp_l0_flag is expressed as a block vector predictor index, and amvr_precision_idx is expressed as a block vector spatial resolution precision index.

In the illustration of FIG. 7, when the IBC AMVP mode is used, the video encoding apparatus may determine amvr_precision_idx indicating the spatial resolution of a block vector difference in terms of rate distortion optimization. The video encoding apparatus signals amvr_flag and amvr_precision_idx to the video decoding apparatus to transmit the spatial resolution of the block vector. In other words, the video encoding apparatus transmits amvr_flag to signal whether the AMVR technology is applied to the block vector. In addition, the video encoding apparatus may signal the spatial resolution used for prediction by transmitting amvr_precision_idx indicating one of the spatial resolution candidate lists of the block vector. The video encoding apparatus and the video decoding apparatus share the same spatial resolution candidate list of the block vector. Meanwhile, when the AMVR technology is used in the existing IBC AMVP mode, since amvr_flag is regarded as 1, the video encoding apparatus may omit transmission of amvr_flag.

In the existing IBC AMVP mode, the block vector spatial resolution candidate list shared between the video encoding apparatus and the video decoding apparatus is {1-pel, 4-pel}. When the AMVR technology based on this candidate list is applied, the video encoding apparatus and the video decoding apparatus may determine the spatial resolution of the block vector as shown in Table 1.

TABLE 1

| amvr_flag | amvr_precision_idx | Block vector spatial resolution |
| --- | --- | --- |
| 1 | 0 | 1-pel |
| 1 | 1 | 4-pel |

As described above, according to Table 1, one of 1-pel or 4-pel is selected as the spatial resolution of the block vector, and the spatial resolution of the block vector and the spatial resolution of the block vector difference may be determined according to the selected resolution. In other words, a block vector cannot be expressed based on a subpixel unit smaller than one pixel unit. This is because the conventional encoding method was designed under the premise that subpixel units smaller than pixel units are not necessary because conventional screen content is produced using a computer, unlike natural images. However, unlike conventional screen content, in super high definition screen content produced recently, there are many cases where it is advantageous to express a block vector in subpixel units.

In general, it is more efficient to perform prediction in subpixel units to predict the motion of an object in a natural image. In addition, in the process of encoding a natural video, the IBC mode is not selected very much, and even if it is selected, the encoding efficiency may be very low because spatial resolution in subpixel units cannot be supported. On the other hand, the IBC mode is frequently selected in the process of encoding screen content, and relatively high coding efficiency can be achieved even when spatial resolution in units of pixels is used. For these reasons, there was no need for block vector spatial resolution in subpixel units.

However, as an image rendering technology has recently developed, various techniques are used for screen content to generate motion or smooth images. Accordingly, cases in which BV in subpixel units are advantageous, which have not been considered in terms of existing video coding technologies, are experimentally observed.

For example, in case of game graphics video including ray tracing, motion blur effect, deep learning super sampling (DLSS), anti-aliasing, and the like, various techniques that make it very similar to natural video are applied. Although this video is computer-generated screen content, it may have features that can be seen in real natural images, such as light smearing and motion blur. If an existing AMVR technology having a spatial resolution of integer pixels is applied to such a graphic image, the efficiency of the IBC technology may be very low because detailed prediction is not performed. According to the disclosure, this problem of the existing technology can be solved by using the spatial resolution of the block vector in units of subpixels.

In addition to the problem of spatial resolution described above, the existing technology has an additional inefficient aspect. Hereinafter, additional inefficient aspects are described using the illustration of FIG. 8.

Figure 8:
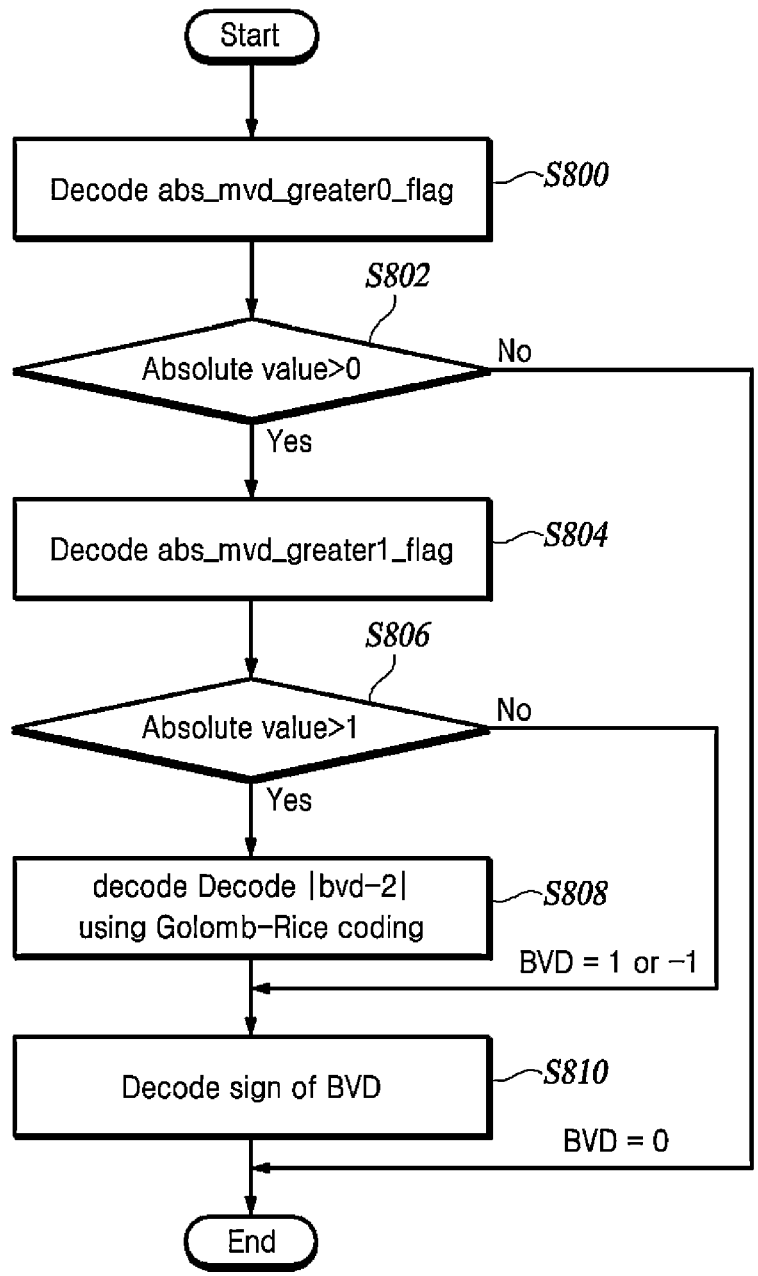
FIG. 8 is a flowchart illustrating a method for decoding a block vector difference.

FIG. 8 is a flowchart illustrating a method for decoding a block vector difference.

In the IBC technology, in order to transmit a block vector, the video encoding apparatus divides the block vector into a block vector predictor and a block vector difference and then transmits them to the video decoding apparatus. The video decoding apparatus may decode the block vector difference as in the illustration of FIG. 8. Meanwhile, the illustration shown in FIG. 8 may be similarly applied to the video encoding apparatus, however, the video encoding apparatus may obtain necessary flags from a high level.

The video decoding apparatus parses the flag abs_mvd_greater0_flag indicating whether the absolute value of the block vector difference is greater than 0 (S800) and then checks the absolute value (S802). When the absolute value of BVD is 0 or less (No in S802), the parsing of BVD is terminated.

When the absolute value of the BVD is greater than 0 (Yes In S802), the video decoding apparatus parses the flag, abs_mvd_greater1_flag indicating whether the absolute value of the block vector difference is greater than 1 (S804), and then the video decoding apparatus checks the absolute value (S806). When the absolute value of the BVD is 1 or less (No in S806), the absolute value of the block vector difference is determined to be 1, and a BVD sign decoding step (S810) is performed.

When the absolute value of BVD is greater than 1 (Yes in S806), the video decoding apparatus decodes the value of

|BVD−2| using Golomb-Rice coding (S808). The video decoding apparatus may generate an absolute value of BVD using the value of |BVD−2|.

The video decoding apparatus decodes the BVD sign (S810). Thereafter, the video decoding apparatus may combine the absolute value of the BVD and the sign of the BVD to finally generate a block vector difference. The video decoding apparatus may perform the above-described process for each of the horizontal and vertical elements of the BVD.

Figure 9:
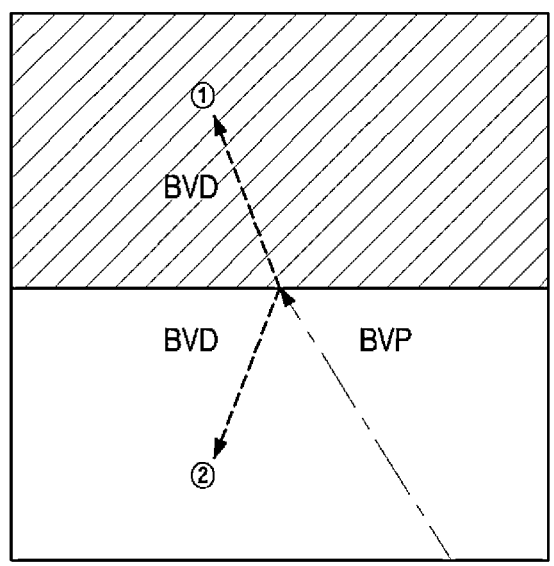
FIG. 9 is a diagram illustrating a case in which a sign of a block vector difference is restricted according to an embodiment of the present disclosure.

Meanwhile, when a block vector predictor indicates a vicinity of an edge of an area in which a reference block may exist, the sign of the block vector difference may be limited according to the block vector difference. An area in which a reference block may exist may be constituted per picture, slice, tile, or CTU basis or may be constituted per separate virtual buffer basis. It is assumed that the reference block indicated by the block vector predictor is positioned near the top boundary of the area that can be referenced, as in the illustration of FIG. 9. In this case, if the sign of the vertical element of the block vector difference is a negative number, the current block cannot use the area indicated by the block vector as a reference block. In other words, the sign of the vertical element of the block vector difference must be positive. Nevertheless, in the conventional art, the sign of the block vector difference is always signaled.

By pre-calculating the block vector before encoding or parsing the sign of the block vector difference, this problem of the existing technology can be solved. Meanwhile, an area in which a reference block may exist, a block vector predictor, a size of a block vector difference, block vector spatial resolution, and the like may be considered for pre-calculating the block vector.

Hereinafter, realization examples for solving the above problems are described.

Hereinafter, the present realization examples are described focusing on adaptive encoding of a block vector of a current block by the video encoding apparatus. Such adaptive encoding of the block vector may be performed by the intra predictor 122 in the video encoding apparatus. On the other hand, for convenience of description, the video decoding apparatus is referred to, if necessary. Nonetheless, most of the embodiments described below may be equally or similarly applied to the video decoding apparatus. Meanwhile, the video encoding apparatus determines information related to adaptive encoding of a block vector (flags and indexes to be described later) in terms of rate distortion optimization. Thereafter, the video encoding apparatus may encode the information to generate a bitstream and then may signal the bitstream to the video decoding apparatus. Also, the video encoding apparatus may determine the spatial resolution of the block vector of the current block by obtaining information related to the adaptive encoding of the block vector from a high level.

II. Block Vector with Adaptive Spatial Resolution

<Example 1> Method of Signaling Block Vector Spatial Resolution

In the present realization example, the video encoding apparatus selects one of single or multiple block vector spatial resolution candidate lists and then selects a block vector spatial resolution of the selected list according to amvr_precision_idx. In this case, each block vector spatial resolution candidate list may be variously constituted depending on embodiments, and the constitution method of the list may also be implemented in various ways depending on embodiments. For example, the video encoding apparatus may use at least one of the following as an element of the candidate list to constitute a block vector spatial resolution candidate list.

First, the block vector spatial resolutions of neighboring blocks positioned at the top, top right, top left, left, bottom left, and the like of the current block may be used. In addition, the previously used block vector spatial resolution on the encoding (or decoding) order may be used. In addition, a preset block vector spatial resolution may be used. Finally, the block vector spatial resolution determined based on the frequency of use of the block vector spatial resolution may be used.

Figure 10:
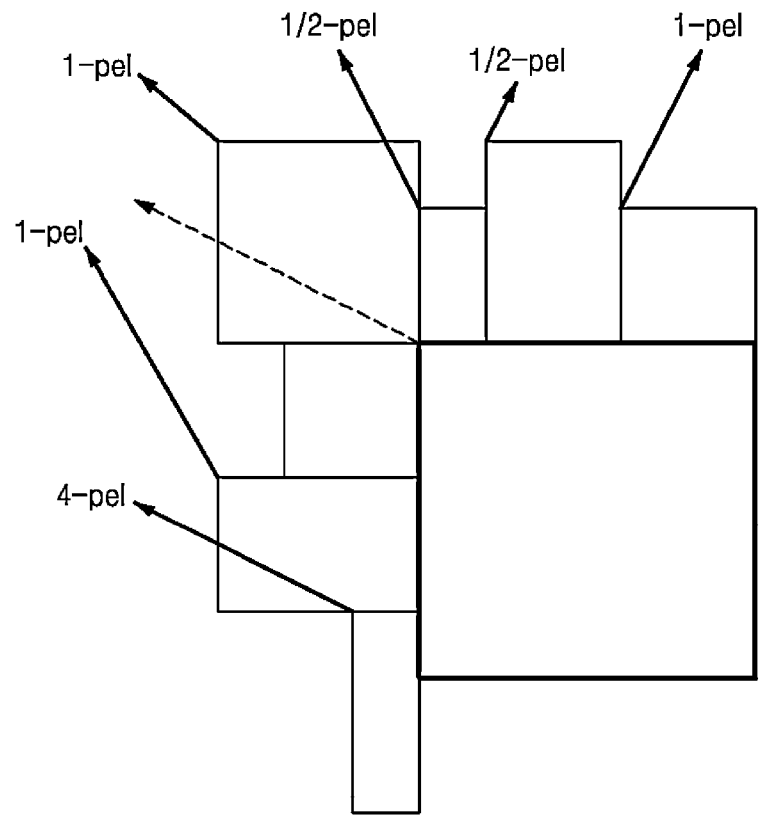
FIG. 10 is a diagram illustrating block vector spatial resolution values of neighboring blocks according to an embodiment of the present disclosure.

FIG. 10 is a diagram illustrating block vector spatial resolution values of neighboring blocks according to an embodiment of the present disclosure.

When the block vector spatial resolution values of neighboring blocks are distributed as illustrated in FIG. 10, the video encoding apparatus considers the frequency of use of the block vector spatial resolution values and places the block vector spatial resolution values at the front of the list as the block vector spatial resolution values approach the most frequently used resolution. For example, the list may be constituted as {1-pel, ½-pel, 4-pel}.

Meanwhile, as described above, one block vector spatial resolution candidate list may be constituted, but a plurality of block vector spatial resolution candidate lists may be constituted according to an embodiment.

In order to use the block vector spatial resolution in integer pixel unit and subpixel unit, the video encoding apparatus may constitute candidate lists and then may transmit amvr_precision_idx indicating the block vector spatial resolution to the video decoding apparatus. Hereinafter, detailed realization examples related to this are described.

Example 1-1: Method Using One Block Vector Spatial Resolution List

In the present realization example, the video encoding apparatus constitutes one block vector spatial resolution list and then signals the spatial resolution of the block vector using amvr_precision_idx.

The block vector spatial resolution list may be constituted using all or some of the various components as described above. For example, based on the illustration of FIG. 10, as described above, when one block vector spatial resolution candidate list {1-pel, ½-pel, 4-pel} is constituted, the video encoding apparatus may transmit amvr_precision_idx to the video decoding apparatus and may indicate a spatial resolution. For example, when amvr_precision_idx is transmitted as 1, the corresponding block vector has a spatial resolution of ½-pel.

Example 1-2: Method Using a Plurality of Block Vector Spatial Resolution Lists

In the present realization example, the video encoding apparatus determines the block vector spatial resolution candidate list and the spatial resolution of the block vector using the signal. As described above, the video encoding apparatus classifies various block vector spatial resolution candidates into a plurality of groups according to a preset condition and then constitutes a plurality of block vector spatial resolution candidate lists.

In this case, as a criterion for classifying a plurality of groups, first, a type of spatial resolution of a block vector, such as an integer pixel unit or a subpixel unit, may be used. Next, the positions of neighboring blocks of the current block may be used. For example, one list may include the block vector spatial resolution of blocks positioned at the top (top, top right, top left, and the like) of the current block, and the other list may include the block vector spatial resolution of blocks positioned at the left (left e, top left, bottom left, and the like) of the current block.

As an embodiment, it is assumed that usable spatial resolution is {¼-pel, 1-pel, 2-pel, 4-pel, ½-pel}. When block vector spatial resolution values are classified in integer pixel units and subpixel units, the video encoding apparatus may constitute two spatial resolution candidate lists, as illustrated in Table 2.

TABLE 2

| amvr_set_idx | block vector spatial resolution candidate list |
|---|---|
| 0 | {1, 2, 4} |
| 1 | {½, ¼} |

According to Table 2, the video encoding apparatus may select one of a plurality of block vector spatial resolution candidate lists using amvr_set_idx and then may determine the block vector spatial resolution using amvr_precision_idx. For example, when amvr_set_idx is 1 and amvr_precision_idx is 1, the block vector spatial resolution is determined to ¼-pel.

<Example 2> Use of One Spatial Resolution in Subpixel Unit without Separate Signal Transmission In the present realization example, the video encoding apparatus uses one block vector spatial resolution without separate signal transmission. In the conventional art, for a CU using the IBC mode, amvr_precision_idx is always transmitted. However, in the present example, the video encoding apparatus may use block vectors having various spatial resolutions without transmitting amvr_precision_idx. In order to use various block vector spatial resolutions without separate signal transmission, the video encoding apparatus may consider at least the following items.

First, the video encoding apparatus considers whether block vectors of neighboring blocks are used. Also, the video encoding apparatus considers the block vector spatial resolution values of neighboring blocks (top, top right, top left, left, bottom left, and the like). Also, the video encoding apparatus may consider a preset block vector spatial resolution.

For example, when the spatial resolution of the preset block vector is ½-pel, the video encoding apparatus may use the block vector having the ½-pel spatial resolution without transmitting amvr_flag and amvr_precision_idx.

As another embodiment, the distribution of block vector spatial resolution of neighboring blocks may be considered as follows. When AMVR is not applied to the top and left blocks, the video encoding apparatus uses a preset spatial resolution. Here, the preset spatial resolution may be one of spatial resolution values, such as 4-pel, 2-pel, 1-pel, ½-pel, or ¼-pel. Alternatively, when AMVR is applied to one of the top and left blocks, the video encoding apparatus may use the block vector spatial resolution of the block to which AMVR is applied. Alternatively, when AMVR is applied to the top and left blocks, the video encoding apparatus may use the block vector spatial resolution of one of the two blocks according to a preset method. Here, the preset method may be one of a method using a more precise spatial resolution, a method using a less precise spatial resolution, or a method using a preset spatial resolution.

Figure 11:
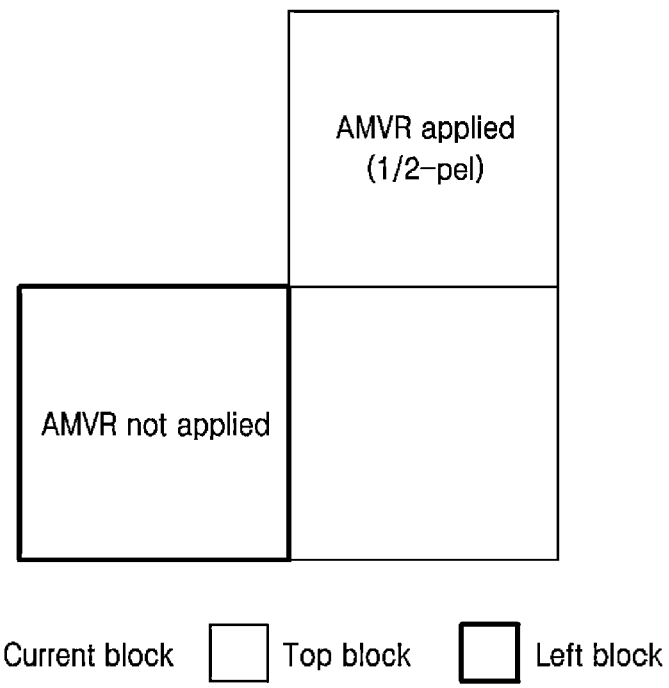
FIG. 11 is a diagram illustrating application of adaptive motion vector resolution (AMVR) to neighboring blocks according to an embodiment of the present disclosure.

For example, as in the illustration of FIG. 11, when AMVR is applied to the top block and the spatial resolution of a corresponding block vector is ½-pel, and AMVR is not applied to the left block, the video encoding apparatus may determine the block vector spatial resolution of a current block as ½-pel.

As another embodiment, unlike the illustration of FIG. 11, when there is a plurality of top or left blocks, the video encoding apparatus may select a representative block from among the plurality of blocks and then may consider the spatial resolution of the block vector of the selected representative block. The representative block may be determined according to one of the following methods. Among the top blocks, a leftmost block, a center block, or a rightmost block may be determined as the representative top block. Alternatively, among the left blocks, an uppermost block, a center block, or a lowermost block may be determined as the representative left block.

Figure 12:
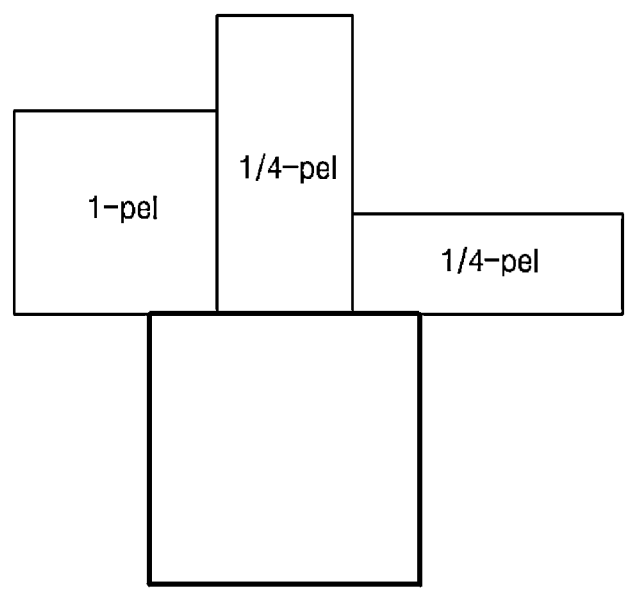
FIG. 12 is a diagram illustrating block vector spatial resolution values of neighboring blocks according to another embodiment of the present disclosure.
Figure 12:
Figure 12:

Alternatively, the video encoding apparatus may consider the most frequently used block vector spatial resolution among a plurality of blocks without determining a representative block. For example, when the block vector spatial resolution distribution of the top blocks is the same as the illustration of FIG. 12, ¼-pel, which is the most frequently used block vector spatial resolution, may be the top block vector spatial resolution.

<Example 3> Determination the Use of Example 1 or Example 2 Based on a Flag

In the present implementation example, the video encoding apparatus may determine application of Example 1 or Example 2 using a flag. In other words, the video encoding apparatus may use the methods of Example 1 and Example 2 using abvr_enable_flag. For example, the video encoding apparatus may use the method of Example 1 or Example 2 when abvr_enable_flag is 1, and the video encoding apparatus may not apply the realization examples when abvr_enable_flag is 0. abvr included in the name of the flag refers to adaptive block vector resolution.

III. Adaptive Signaling of Sign of Block Vector Difference

<Example 4> Method of Deriving a Sign of a Block Vector Difference

In the present realization example, when applying the IBC technology, and when the block vector predictor is near the edge of the area, which the current block can refer to, the video encoding apparatus derives the sign of the block vector difference and uses the derived sign. An area, which the current block cannot refer to, may include an area that has not yet been restored, an area of another slice, an area of another CTU, an area other than a virtual buffer, and the like. Coding efficiency can be improved by omitting signaling and parsing of a flag indicating a sign of a difference by deriving the sign of the block vector difference.

In the conventional art, the video encoding apparatus first generates a block vector predictor and then obtains a block vector difference. The video encoding apparatus may calculate a final block vector by combining the block vector difference and the block vector spatial resolution, but there is no need to transmit the sign of the block vector difference in a specific case. This case may occur more frequently when the block vector spatial resolution is obtained prior to the block vector difference.

Figure 13A:
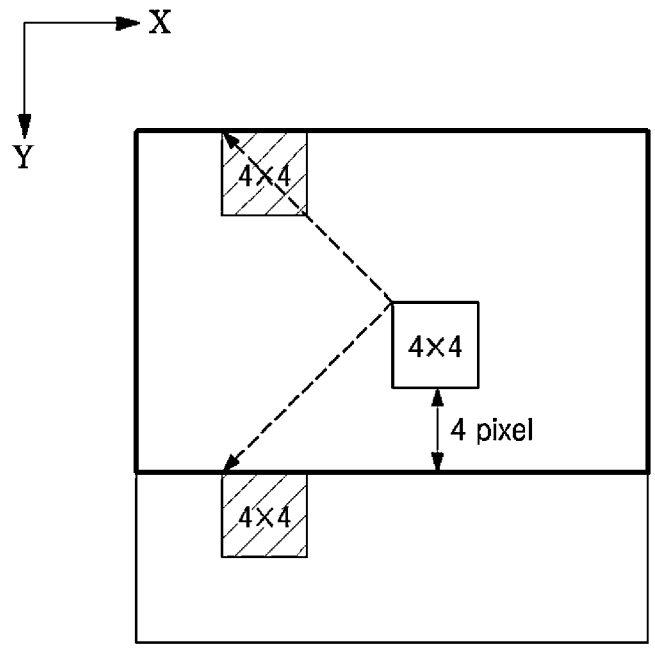
FIGS. 13A and 13B are diagrams illustrating positions of reference blocks according to block vectors according to another embodiment of the present disclosure.
Figure 13B:
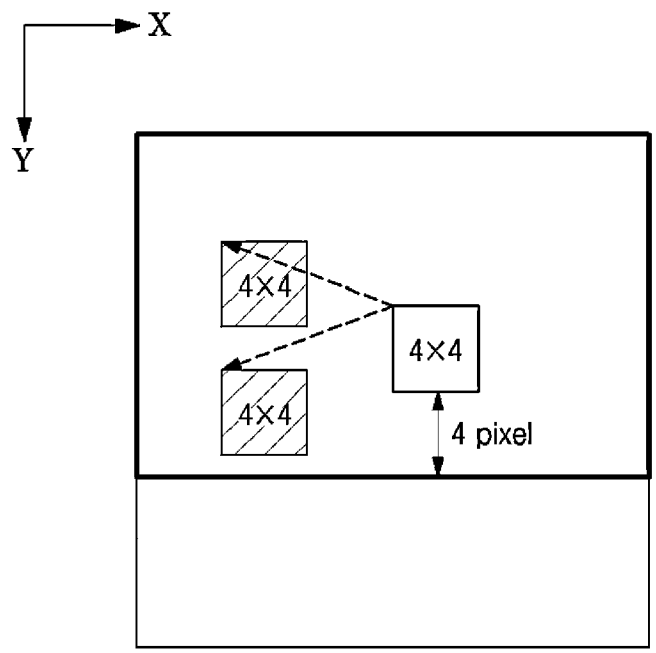
Figure 13B:
Figure 13B:
Figure 13B:
Figure 13B:

For example, as in the illustration of FIG. 13A, assume that a reference block indicated by BVP is an edge of an area, which a reference block may refer to, a block vector spatial resolution is 4-pel, and a vertical element of a block vector difference is 2. When the sign of the vertical component of the block vector difference is negative (−), the position of the reference block according to the block vector may include an unrestored area as shown in the illustration of FIG. 13A. Therefore, the sign of the vertical element of the block vector difference is unconditionally positive (+). On the other hand, as in the illustration of FIG. 13B, if the vertical element of the block vector difference is 2 and the block vector spatial resolution is 1-pel, the sign of the vertical component of the block vector difference may be both positive (+) and negative (−). Accordingly, the video encoding apparatus may maximize the efficiency of the present example by first obtaining the block vector spatial resolution before obtaining a sign of a block vector difference.

Meanwhile, the video encoding apparatus may derive a block vector difference according to the present implementation example as follows.

The block vector predictor is represented by BVP ($BVP_x$, $BVP_y$), and the application of the block vector spatial resolution to the absolute value of the block vector difference is represented by BVD ($BVD_x$, $BVD_y$). Here, $BVD_x$ and $BVD_y$ denote the horizontal and vertical elements of BVD, respectively. The video encoding apparatus may generate four block vector candidates as shown in Equation 1 by differently combining the signs of the horizontal element and vertical element of the BVD.

$BV_1(BVP_x+BVD_x,BVP_y+BVD_y)$ $BV_2(BVP_x+BVD_x, BVP_y-BVD_y)$ $BV_3(BVP_x-BVD_x,BVP_y+BVD_y)$ $BV_4(BVP_x-BVD_x,BVP_y-BVD_y)$ [Equation 1]

The video encoding apparatus generates a reference block at a position indicated by each block vector candidate using the four block vector candidates shown in Equation 1. In this case, when the reference block at the position indicated by a specific block vector candidate includes an area that cannot be referenced, the video encoding apparatus cannot use the corresponding block vector candidate. When a usable candidate among the four candidates is determined in this way, when the sign of the block vector difference may be determined as either positive or negative, the video encoding apparatus may omit coding for the sign of the block vector difference. In addition, the video decoding apparatus may derive the sign of the block vector difference without parsing and then may use the derived sign. For example, when only $BV_1$ and $BV_2$ are usable among the four block vector candidates, the sign of the horizontal element of the block vector difference is not encoded because it is derived as a positive value, and the sign of the vertical element is encoded.

Meanwhile, when the horizontal or vertical element of the block vector difference is 0, two block vector candidates may be used instead of the four block vector candidates. For example, the video encoding apparatus may use two candidates shown in Equation 2 when the horizontal element of the difference of the block vector is 0, and the video encoding apparatus may use two candidates shown in Equation 3 when the vertical element is 0.

$BV_1(BVP_x,BVP_y+BVD_y)$ $BV_2(BVP_x,BVP_y-BVD_y)$ [Equation 2]

$BV_1(BVP_x+BVP_x,BVD_y)$ $BV_2(BVP_x-BVP_x,BVD_y)$ [Equation 3]

Hereinafter, a method for adaptively generating a block vector of a current block based on Example 1 and Example 4 by the video encoding apparatus or the video decoding apparatus is described using the illustrations in FIGS. 14 and 15.

Figure 14:
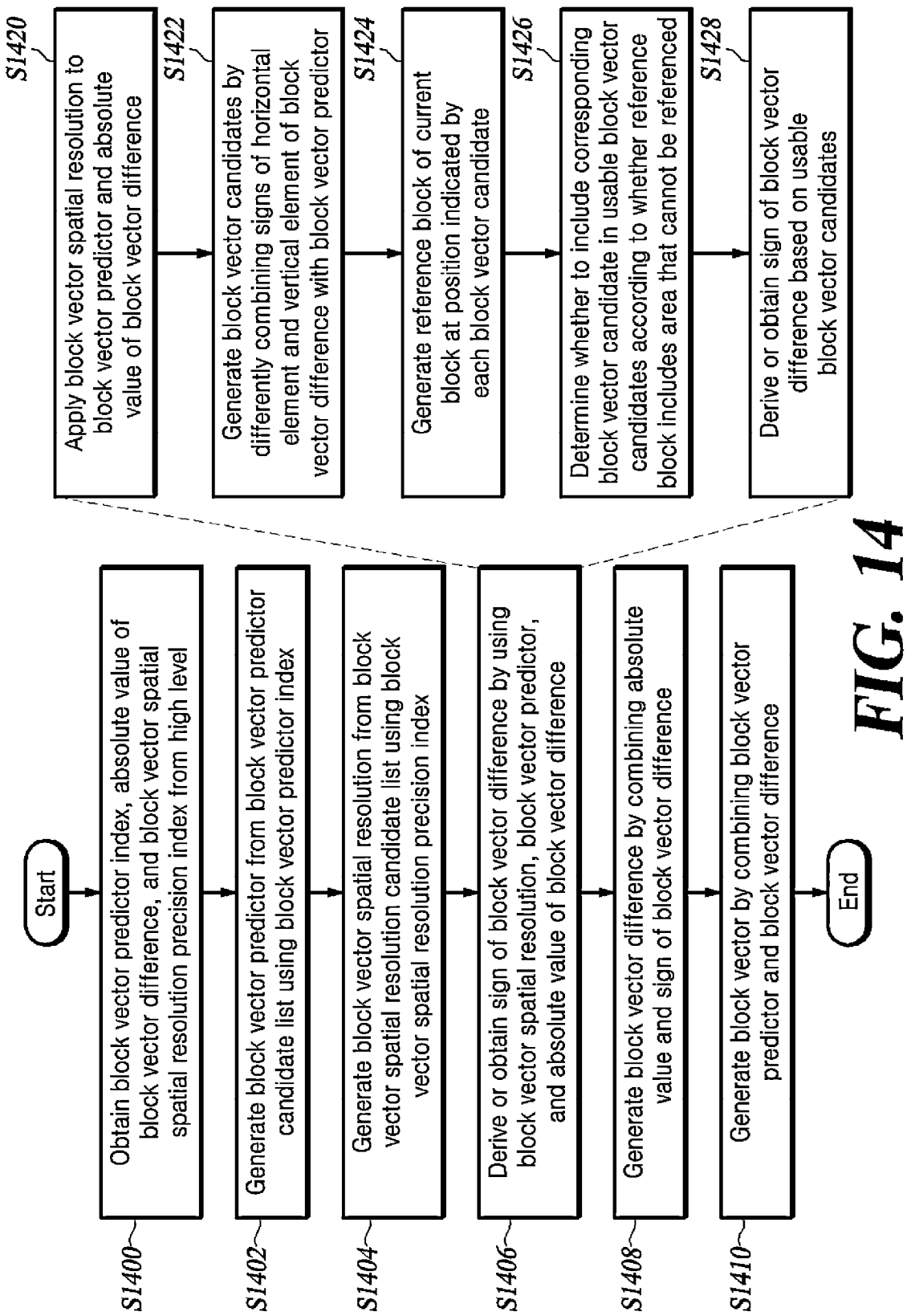
FIG. 14 is a flowchart illustrating a method for adaptively generating a block vector of a current block performed by a video encoding apparatus according to an embodiment of the present disclosure.

FIG. 14 is a flowchart illustrating a method for adaptively generating a block vector of a current block performed by a video encoding apparatus according to an embodiment of the present disclosure.

The video encoding apparatus obtains a block vector predictor index, an absolute value of a block vector difference, and a block vector spatial resolution precision index from a high level (S1400). Also, the video encoding apparatus may encode the block vector predictor index, the absolute value of the block vector difference, and the block vector spatial resolution precision index and then may signal them to the video decoding apparatus.

After generating a block vector predictor candidate list of a current block, the video encoding apparatus generates a block vector predictor from the block vector predictor candidate list using the block vector predictor index (S1402). The video encoding apparatus may generate a block vector predictor candidate list of the current block similarly to a method for generating an AMVP candidate list of inter prediction.

After generating the block vector spatial resolution candidate list, the video encoding apparatus generates a block vector spatial resolution from the block vector spatial resolution candidate list using the block vector spatial resolution precision index (S1404).

The video encoding apparatus may constitute various block vector spatial resolution candidate lists according to embodiments and may use various methods of constituting the lists. For example, the video encoding apparatus may use at least one of the following as an element of the candidate list to constitute the block vector spatial resolution candidate list.

First, the block vector spatial resolutions of neighboring blocks positioned at the top, top right, top left, left, bottom left, and the like of the current block may be used. In addition, the previously used block vector spatial resolution on the encoding order may be used. In addition, a preset block vector spatial resolution may be used. Finally, the block vector spatial resolution determined based on the frequency of use of the block vector spatial resolution may be used. When the candidate list is constituted based on the frequency of use, a block vector spatial resolution with a higher frequency of use may be placed at the front of the candidate list.

Meanwhile, the block vector spatial resolution candidate list may include at least one spatial resolution value in integer pixel units and at least one spatial resolution value in subpixel units.

The video encoding apparatus derives or obtains a sign of a block vector difference by using the block vector spatial resolution, the block vector predictor, and the absolute value of the block vector difference (S1406).

The video encoding apparatus may derive or obtain the sign of the block vector difference using the following steps.

The video encoding apparatus applies the block vector spatial resolution to the block vector predictor and the absolute value of the block vector difference (S1420).

The video encoding apparatus generates block vector candidates by differently combining the signs of the horizontal element and vertical element of the block vector difference with the block vector predictor (S1422).

The video encoding apparatus generates a reference block of the current block at a position indicated by each block vector candidate (S1424).

The video encoding apparatus determines whether to include the corresponding block vector candidate in the usable block vector candidates according to whether the reference block includes the area that cannot be referenced (S1426).

The video encoding apparatus derives or obtains the sign of the block vector difference based on the usable block vector candidates (S1428).

When determining the usable block vector candidates, the video encoding apparatus derives the sign of the block vector difference in case that the sign of the block vector difference is determined to be positive or negative. Alternatively, in case that the sign of the block vector difference is not determined to be positive or negative, the video encoding apparatus may obtain the sign of the block vector difference from a high level.

The video encoding apparatus generates the block vector difference by combining the absolute value and sign of the block vector difference (S1408).

The video encoding apparatus generates the block vector by combining the block vector predictor and the block vector difference (S1410).

Figure 15:
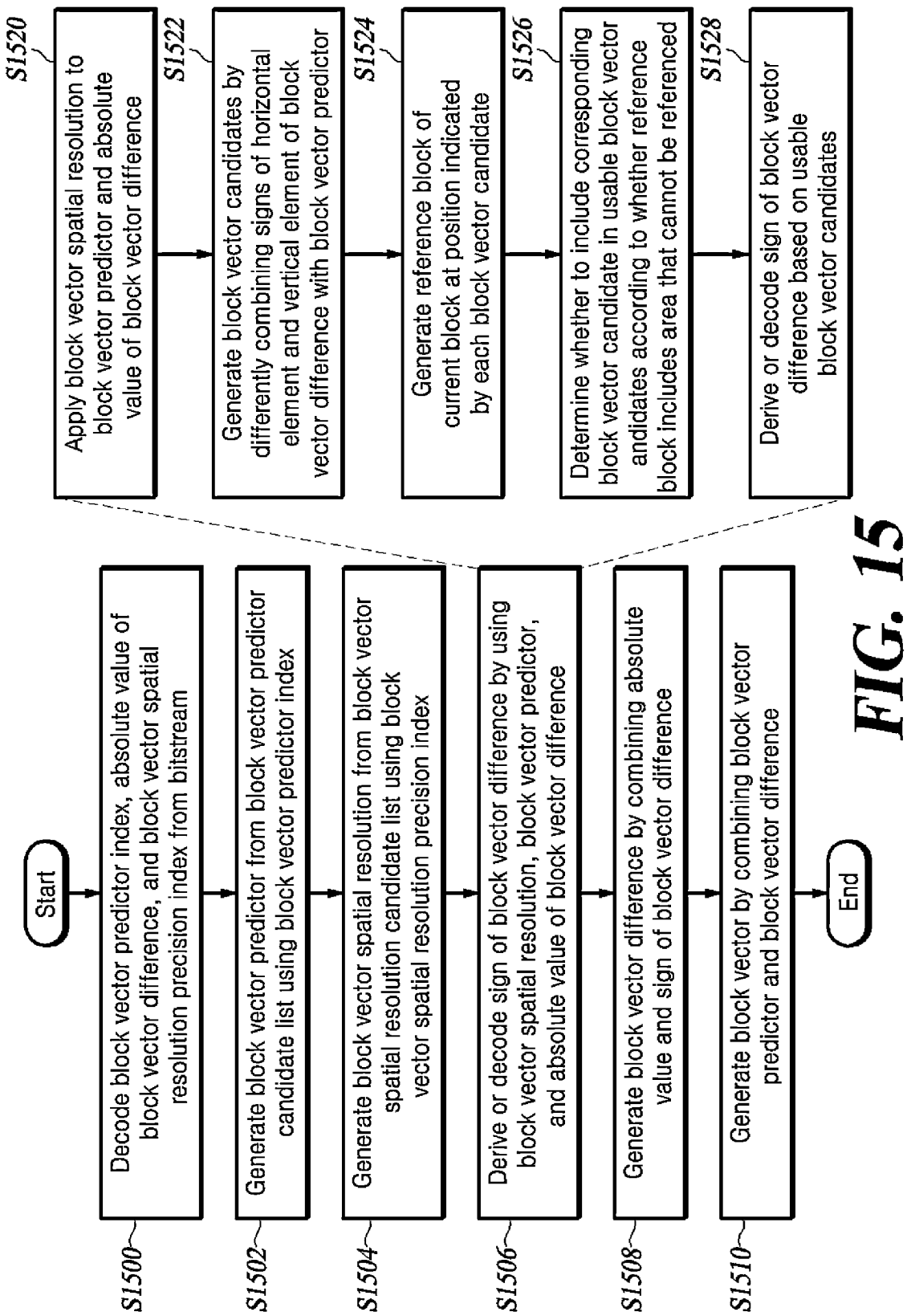
FIG. 15 is a flowchart illustrating a method for adaptively generating a block vector of a current block performed by a video decoding apparatus according to an embodiment of the present disclosure.

FIG. 15 is a flowchart illustrating a method for adaptively generating a block vector of a current block performed by a video decoding apparatus according to an embodiment of the present disclosure.

The video decoding apparatus decodes a block vector predictor index, an absolute value of a block vector difference, and a block vector spatial resolution precision index from a bitstream (S1500).

After generating a block vector predictor candidate list of a current block, the video decoding apparatus generates a block vector predictor from the block vector predictor candidate list using the block vector predictor index (S1502). The video decoding apparatus may generate a block vector predictor candidate list of the current block similarly to a method for generating an AMVP candidate list of inter prediction.

After generating the block vector spatial resolution candidate list, the video decoding apparatus generates a block vector spatial resolution from the block vector spatial resolution candidate list using the block vector spatial resolution precision index (S1504). Since the video decoding apparatus generates the block vector spatial resolution using the same method as the above-described video encoding apparatus, additional detailed description is omitted.

Meanwhile, the block vector spatial resolution candidate list may include at least one spatial resolution value in integer pixel units and at least one spatial resolution value in subpixel units.

The video decoding apparatus derives or decodes a sign of a block vector difference by using the block vector spatial resolution, the block vector predictor, and the absolute value of the block vector difference (S1506).

The video decoding apparatus may derive or decode the sign of the block vector difference using the following steps.

The video decoding apparatus applies the block vector spatial resolution to the block vector predictor and the absolute value of the block vector difference (S1520).

The video decoding apparatus generates block vector candidates by differently combining the signs of the horizontal element and vertical element of the block vector difference with the block vector predictor (S1522).

The video decoding apparatus generates a reference block of the current block at a position indicated by each block vector candidate (S1524).

The video decoding apparatus determines whether to include the corresponding block vector candidate in the usable block vector candidates according to whether the reference block includes the area that cannot be referenced (S1526).

The video decoding apparatus derives or obtains the sign of the block vector difference based on the usable block vector candidates (S1528).

When determining the usable block vector candidates, the video decoding apparatus derives the sign of the block vector difference in case that the sign of the block vector difference is determined to be positive or negative. Alternatively, in case that the sign of the block vector difference is not determined to be positive or negative, the video decoding apparatus may decode the sign of the block vector difference from a bitstream.

The video decoding apparatus generates the block vector difference by combining the absolute value and sign of the block vector difference (S1508).

The video decoding apparatus generates the block vector by combining the block vector predictor and the block vector difference (S1510).

Hereinafter, a method for adaptively generating a block vector of a current block based on Example 2 and Example 4 by the video encoding apparatus or the video decoding apparatus is described using the illustrations in FIGS. 16 and 17.

Figure 16:
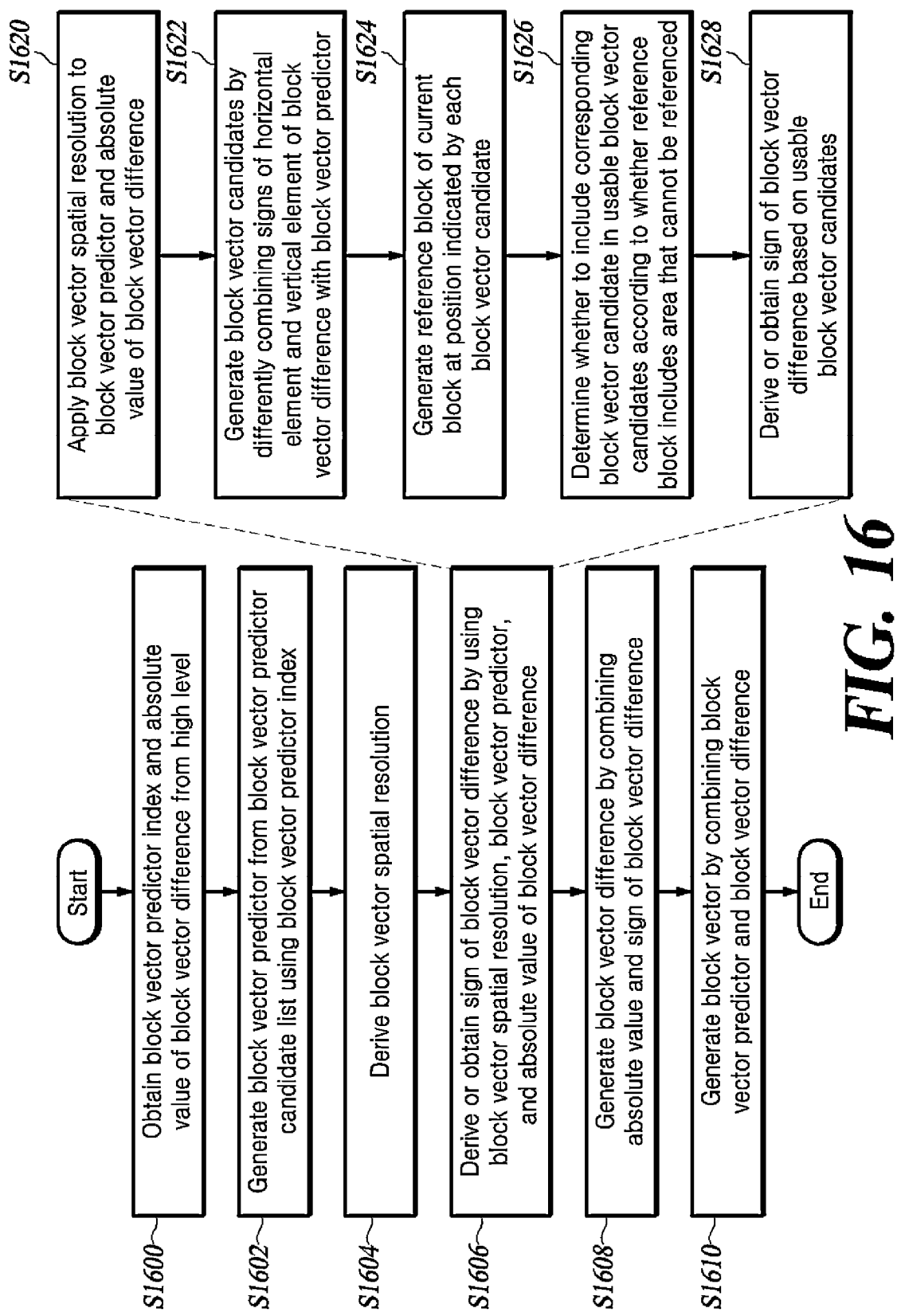
FIG. 16 is a flowchart illustrating a method for adaptively generating a block vector of a current block performed by a video encoding apparatus according to another embodiment of the present disclosure.

FIG. 16 is a flowchart illustrating a method for adaptively generating a block vector of a current block performed by a video encoding apparatus according to another embodiment of the present disclosure.

The video encoding apparatus obtains a block vector predictor index and an absolute value of a block vector difference from a high level (S1600). Also, the video encoding apparatus may encode the block vector predictor index and the absolute value of the block vector difference and then may signal them to the video decoding apparatus.

After generating a block vector predictor candidate list of a current block, the video encoding apparatus generates a block vector predictor from the block vector predictor candidate list using the block vector predictor index (S1602).

The video encoding apparatus derives a block vector spatial resolution (S1604).

The video encoding apparatus may use a preset block vector spatial resolution as the block vector spatial resolution. In this case, the preset block vector spatial resolution may be a spatial resolution in integer pixel units or in subpixel units.

When adaptive spatial resolution is not applied to the top and left blocks of the current block, the video encoding apparatus may use a preset block vector spatial resolution as the block vector spatial resolution. In this case, the preset block spatial resolution may be a spatial resolution in integer pixel units or subpixel units. In addition, when the adaptive spatial resolution is applied to one of the top or left blocks of the current block, the video encoding apparatus may use the spatial resolution of the block to which the adaptive spatial resolution is applied as the block vector spatial resolution. In addition, when the adaptive spatial resolution is applied to the top and left blocks of the current block, the video encoding apparatus may use the spatial resolution of one of the top and left blocks as the block vector spatial resolution according to a preset method. Here, the preset method may be one of a method using a more precise spatial resolution, a method using a less precise spatial resolution, or a method using a preset spatial resolution.

The video encoding apparatus derives or obtains a sign of a block vector difference using the block vector spatial resolution, the block vector predictor, and the absolute value of the block vector difference (S1606). Since the steps of deriving or acquiring the sign of the block vector difference by the video encoding apparatus are the same as those in the illustration of FIG. 14, additional descriptions are omitted.

The video encoding apparatus generates the block vector difference by combining the absolute value and sign of the block vector difference (S1608).

The video encoding apparatus generates the block vector by combining the block vector predictor and the block vector difference (S1610).

Figure 17:
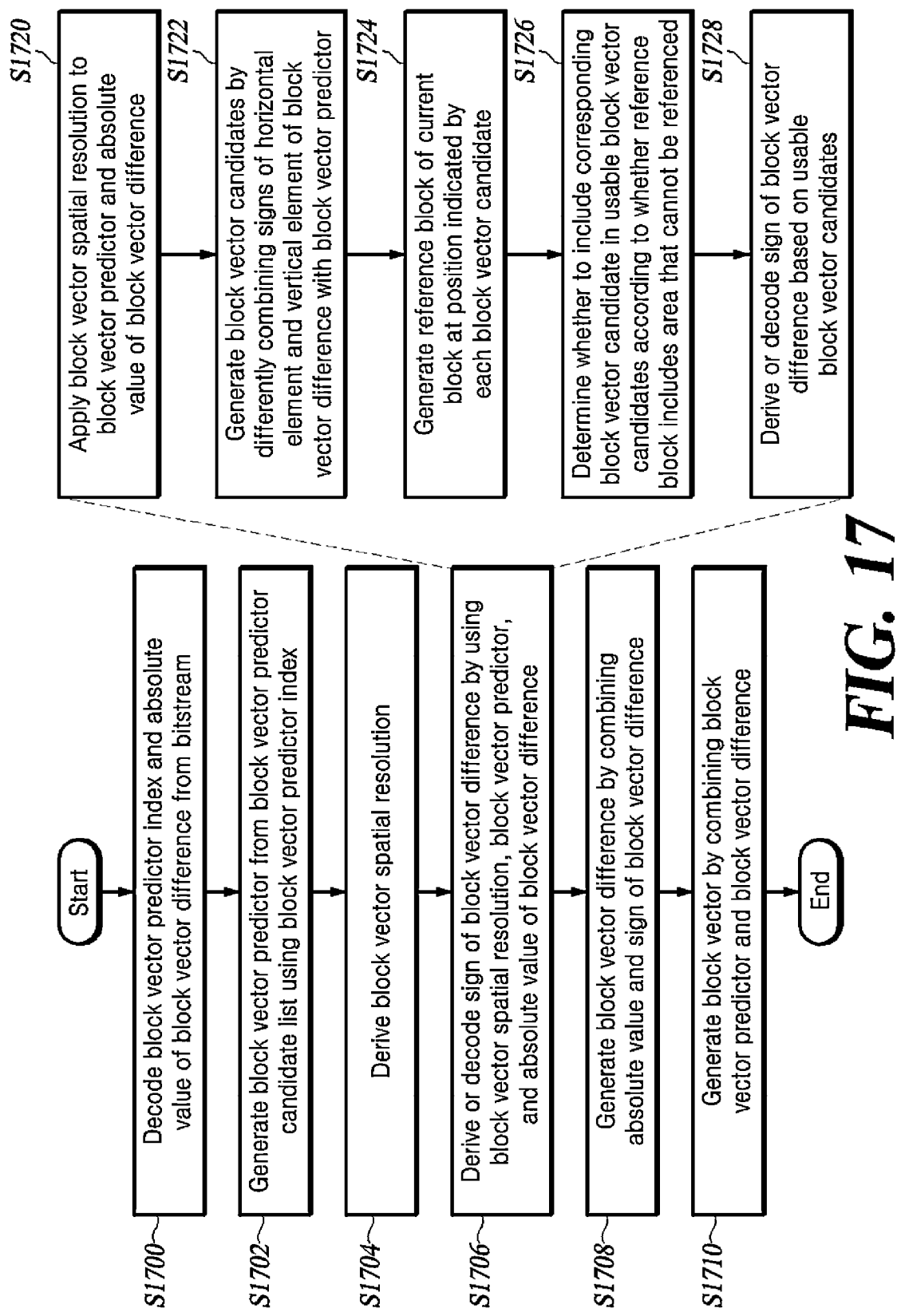
FIG. 17 is a flowchart illustrating a method for adaptively generating a block vector of a current block performed by a video decoding apparatus according to another embodiment of the present disclosure.

FIG. 17 is a flowchart illustrating a method for adaptively generating a block vector of a current block performed by a video decoding apparatus according to another embodiment of the present disclosure.

The video decoding apparatus decodes a block vector predictor index and an absolute value of a block vector difference from a bitstream (S1700).

After generating a block vector predictor candidate list of a current block, the video decoding apparatus generates a block vector predictor from the block vector predictor candidate list using the block vector predictor index (S1702).

The video decoding apparatus derives a block vector spatial resolution (S1704). Since the video decoding apparatus derives the block vector spatial resolution using the same method as the above-described video encoding apparatus, additional detailed description is omitted.

The video decoding apparatus derives or decodes a sign of the block vector difference using the block vector spatial resolution, the block vector predictor, and the absolute value of the block vector difference (S1706). Since the steps of deriving or decoding the sign of the block vector difference by the video decoding apparatus are the same as those in the illustration of FIG. 15, additional description is omitted.

The video decoding apparatus generates the block vector difference by combining the absolute value and sign of the block vector difference (S1708).

The video decoding apparatus generates the block vector by combining the block vector predictor and the block vector difference (S1710).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure should not be limited by the above explicitly described embodiments but by the claims and equivalents thereof.

REFERENCE NUMERALS

124: inter predictor
510: entropy decoder
544: inter predictor

What is claimed is:

1. A method for adaptively generating a block vector of a current block in an intra block copy (IBC) mode performed by a video decoding apparatus, the method comprising:
    decoding a block vector predictor index and an absolute value of a block vector difference from a bitstream;
    generating a block vector predictor candidate list of the current block and generating a block vector predictor from the block vector predictor candidate list using the block vector predictor index;
    deriving a block vector spatial resolution;
    deriving or decoding a sign of the block vector difference using the block vector spatial resolution, the block vector predictor, and the absolute value of the block vector difference;
    generating the block vector difference by combining the absolute value and the sign of the block vector difference; and
    generating the block vector by combining the block vector predictor and the block vector difference.

2. The method of claim 1, wherein the block vector spatial resolution candidate list includes at least one spatial resolution value in integer pixel unit and at least one spatial resolution values in subpixel unit.

3. The method of claim 1, wherein deriving or decoding the sign includes:
    applying the block vector spatial resolution to the block vector predictor and the absolute value of the block vector difference;

generating block vector candidates by differently combining the sign of the block vector difference with the block vector predictor;
generating a reference block of the current block at a position indicated by each block vector candidate;
determining whether to include a corresponding block vector candidate in usable block vector candidates according to whether the reference block includes an area that cannot be referenced; and
deriving or decoding the sign of the block vector difference based on the usable block vector candidates.

4. The method of claim 3, wherein, when determining the usable block vector candidates, deriving or decoding the sign includes:
deriving the sign of the block vector difference in case that the sign of the block vector difference is determined to be positive or negative; and
decoding the sign of the block vector difference from the bitstream in case that the sign of the block vector difference is not determined to be positive or negative.

5. The method of claim 1, wherein deriving the block vector spatial resolution includes:
using a preset block vector spatial resolution as the block vector spatial resolution, wherein the preset block vector spatial resolution is a spatial resolution in integer pixel unit or in subpixel unit.

6. The method of claim 1, wherein deriving the block vector spatial resolution includes:
using a preset block vector spatial resolution as the block vector spatial resolution when adaptive spatial resolution is not applied to top and left blocks of the current block, wherein the preset block vector spatial resolution is a spatial resolution in integer pixel unit or subpixel unit.

7. The method of claim 6, wherein deriving the block vector spatial resolution includes:
using the spatial resolution of the block to which the adaptive spatial resolution is applied as the block vector spatial resolution when the adaptive spatial resolution is applied to one of the top and left blocks of the current block.

8. The method of claim 7, wherein deriving the block vector spatial resolution includes:
using the spatial resolution of one of the top and left blocks as the block vector spatial resolution according to a preset method when the adaptive spatial resolution is applied to the top and left blocks of the current block.

9. A method for adaptively generating a block vector of a current block in an intra block copy (IBC) mode performed by a video encoding apparatus, the method comprising:
obtaining a block vector predictor index and an absolute value of a block vector difference from a high level;
generating a block vector predictor candidate list of the current block and generating a block vector predictor from the block vector predictor candidate list using the block vector predictor index;
deriving a block vector spatial resolution;
deriving or obtaining a sign of the block vector difference using the block vector spatial resolution, the block vector predictor, and the absolute value of the block vector difference;
generating the block vector difference by combining the absolute value and the sign of the block vector difference; and
generating the block vector by combining the block vector predictor and the block vector difference.

10. The method of claim 9, wherein deriving the block vector spatial resolution includes:
using a preset block vector spatial resolution as the block vector spatial resolution, wherein the preset block vector spatial resolution is a spatial resolution in integer pixel unit or in subpixel unit.

11. The method of claim 9, wherein deriving the block vector spatial resolution includes:
using a preset block vector spatial resolution as the block vector spatial resolution when adaptive spatial resolution is not applied to top and left blocks of the current block, wherein the preset block vector spatial resolution is a spatial resolution in integer pixel unit or subpixel unit.

12. The method of claim 11, wherein deriving the block vector spatial resolution includes:
using the spatial resolution of the block to which the adaptive spatial resolution is applied as the block vector spatial resolution when the adaptive spatial resolution is applied to one of the top and left blocks of the current block.

13. The method of claim 12, wherein deriving the block vector spatial resolution includes:
using the spatial resolution of one of the top and left blocks as the block vector spatial resolution according to a preset method when the adaptive spatial resolution is applied to the top and left blocks of the current block.

14. The method of claim 9, wherein deriving or obtaining the sign includes:
applying the block vector spatial resolution to the block vector predictor and the absolute value of the block vector difference;
generating block vector candidates by differently combining the sign of the block vector difference with the block vector predictor;
generating a reference block of the current block at a position indicated by each block vector candidate;
determining whether to include a corresponding block vector candidate in usable block vector candidates according to whether the reference block includes an area that cannot be referenced; and
deriving or obtaining the sign of the block vector difference based on the usable block vector candidates.

15. The method of claim 14, wherein, when determining the usable block vector candidates, deriving or obtaining the sign includes:
deriving the sign of the block vector difference in case that the sign of the block vector difference is determined to be positive or negative; and
obtaining the sign of the block vector difference from the high level in case that the sign of the block vector difference is not determined to be positive or negative.

16. A method for providing video data to a video decoding device, the method comprising:
encoding the video data into a bitstream; and
transmitting the bitstream to the video decoding device,
wherein encoding the video data comprises:
obtaining a block vector predictor index and an absolute value of a block vector difference from a high level;
generating a block vector predictor candidate list of a current block and generating a block vector predictor from the block vector predictor candidate list using the block vector predictor index;

deriving a block vector spatial resolution;
deriving or obtaining a sign of the block vector difference using the block vector spatial resolution, the block vector predictor, and the absolute value of the block vector difference;
generating the block vector difference by combining the absolute value and the sign of the block vector difference; and
generating a block vector by combining the block vector predictor and the block vector difference.

* * * * *